(12) United States Patent
González Pantiga et al.

(10) Patent No.: US 10,053,335 B2
(45) Date of Patent: Aug. 21, 2018

(54) ESCALATOR/MOVING WALKWAY MODULAR TRUSS AND METHOD OF ASSEMBLING AN ESCALATOR/MOVING WALKWAY MODULAR TRUSS

(71) Applicant: ThyssenKrupp Elevator Innovation Center S.A., Gijon (ES)

(72) Inventors: Juan Domingo González Pantiga, Gijon (ES); Eduardo Morán García, Gijon (ES)

(73) Assignee: ThyssenKrupp Elevator Innovation Center S.A., Gijón (ES)

( * ) Notice: Subject to any disclaimer, the term of this patent is extended or adjusted under 35 U.S.C. 154(b) by 0 days.

(21) Appl. No.: 15/191,595

(22) Filed: Jun. 24, 2016

(65) Prior Publication Data

US 2016/0376128 A1 Dec. 29, 2016

(30) Foreign Application Priority Data

Jun. 25, 2015 (EP) .................................... 15382335

(51) Int. Cl.
| | | |
|---|---|---|
| *B66B 23/00* | (2006.01) | |
| *B65G 21/06* | (2006.01) | |
| *B66B 21/02* | (2006.01) | |
| *B66B 21/10* | (2006.01) | |

(52) U.S. Cl.
CPC .............. *B66B 23/00* (2013.01); *B65G 21/06* (2013.01); *B66B 21/02* (2013.01); *B66B 21/10* (2013.01)

(58) Field of Classification Search
CPC ......... B66B 23/00; B66B 21/10; B66B 21/12; B66B 21/00; B65G 21/06

USPC ........................... 198/321, 326, 860.1, 860.2
See application file for complete search history.

(56) References Cited

U.S. PATENT DOCUMENTS

| | | | |
|---|---|---|---|
| 6,374,981 B1* | 4/2002 | Gschwendtner | B66L 323/00 198/321 |
| 6,685,002 B1 | 2/2004 | Nurnberg et al. | |
| 7,431,139 B2* | 10/2008 | Streibig | B66B 23/14 198/326 |
| 8,042,675 B2* | 10/2011 | Gonzalez Alemany | B66L 323/22 198/332 |
| 8,763,781 B2* | 7/2014 | Heinemann | B66B 23/00 198/321 |
| 9,162,851 B2* | 10/2015 | Fan Jin Quan | B66L 329/06 |

(Continued)

FOREIGN PATENT DOCUMENTS

| | | |
|---|---|---|
| CN | 101125624 A | 2/2008 |
| CN | 102030247 A | 4/2011 |

(Continued)

*Primary Examiner* — Gene O Crawford
*Assistant Examiner* — Lester Rushin, III
(74) *Attorney, Agent, or Firm* — The Webb Law Firm

(57) ABSTRACT

An escalator/moving walkway modular truss is disclosed. Each module includes opposite sides including a lower profile and an upper profile, and vertical and diagonal beams placed between the lower profile and the upper profile. The lower profiles directly support an outer cladding of the escalator/moving walkway, and the upper profiles directly support balustrades and outer decking profiles of the escalator/moving walkway. Additionally, a method of assembling an escalator/moving walkway modular truss is disclosed, including the cold rolling of the profiles and the cold joining of vertical and diagonal beams between them.

6 Claims, 6 Drawing Sheets

(56) References Cited

U.S. PATENT DOCUMENTS

| | | |
|---|---|---|
| 2002/0175039 A1 | 11/2002 | Fargo et al. |
| 2009/0050443 A1 | 2/2009 | Aulanko et al. |
| 2013/0228414 A1 | 9/2013 | Heinemann et al. |

FOREIGN PATENT DOCUMENTS

| | | |
|---|---|---|
| CN | 102883987 A | 1/2013 |
| CN | 103917476 A | 7/2014 |
| CN | 203903754 U | 10/2014 |
| EP | 2117747 | 8/2008 |
| EP | 2527283 A1 | 11/2012 |
| GB | 1336360 | 11/1973 |
| JP | 2006266233 A | 10/2006 |
| JP | 2009263062 A | 11/2009 |
| WO | 2011048437 A1 | 4/2011 |
| WO | 2011141945 A | 11/2011 |

* cited by examiner

ESCALATOR/MOVING WALKWAY MODULAR TRUSS AND METHOD OF ASSEMBLING AN ESCALATOR/MOVING WALKWAY MODULAR TRUSS

CROSS-REFERENCE TO RELATED APPLICATION

This application claims priority to European Patent Application No. 15382335.6 filed Jun. 25, 2015, the disclosure of which is hereby incorporated in its entirety by reference.

BACKGROUND OF THE INVENTION

Field of the Invention

The present invention is encompassed within the technical field of escalators and moving walkaways, specifically to the truss and structural elements for holding the mechanism of the escalator/moving walkway, and more specifically, to modular structures assembled together to make a whole escalator/moving walkway truss.

The invention relates, in particular, to an escalator/moving walkway modular truss which is assembled by means of cold joining technology, providing accurate final dimensions, and being able to support and position the whole guiding system and both right and left balustrades of the escalator/moving walkway.

Description of Related Art

Nowadays the escalator and moving walkway truss is intended merely as a structural element with the only aim of holding the mechanisms located inside the escalator or the moving walkway.

Current escalator and moving walkway modular trusses comprise mainly an upper module, a central module and a lower module, assembled together to form the whole truss. FIG. 1 shows and overall view of a current escalator/moving walkway modular truss with those three modules. These modules consist of a plurality of welded steel tubes or hot rolled profiles, which due to bad tolerances and thermal stresses in the manufacturing process made by welding, form a deformed and misaligned truss. These deformations in the welded structure make the following assembly phase of guide supports and guiding system assembly a very time-consuming and expensive process, since due to these deformations and the high number of components, the connection between elements and modules is difficult, and highly qualified operators are required. That is, due to the deformations in the steel during the welding, the final task for each truss assembly is a straightening process of the whole structure in order to maintain the general dimensions into tolerance. This is a very archaic task which depends basically on the expertise of the operators.

In addition, since the welding process does not ensure accurate truss dimensions, it is not possible to get the same general dimensions in two theoretically identical structures. This means that it is not possible to know exactly the time consumed in assembling each escalator or moving walkway.

Another problem is that during the welding process a lot of sparks, fumes and noises are generated, creating a bad environment at working place. Also, to take into account, the high energy consumption in the welding process.

FIGS. 2a, 2b, 2c and 2d show different views of an assembly process of a truss known in the prior art with all the drawbacks thereof. First, welded structures provide dimensions out of tolerance due to poor raw materials and archaic manufacturing process. Also, the assembly of guide supports for supporting and positioning the guiding system of the escalator/moving walkway takes several hours due to adjustments required. Additionally, the assembly of the guiding system takes another big amount of time due to a high precision required, since ride quality of the escalator/moving walkway highly depends on this guiding system. Moreover, the assembly of aluminum supports for balustrades is required and it takes several hours due to adjustments required, and additionally, balustrades have to be assembled on the aluminum supports, requiring this operation additional time.

Document EP2117747 discloses a method for clinching thick metal workpieces and the use of a clinching tool. The invention relates to a method for the production of a load-bearing structural steel connection. A clinching connection is formed by a male die and a female die using local deformation, and it connects two metal workpieces. The metal workpieces are placed on top of each other on a processing surface of the female die and aligned. Then the male die is applied and lowered into the two metal workpieces until the clinching connection is formed by plastic deformation. The die is configured in a rotationally symmetrical manner with regard to the rotational axis thereof and has a conically shaped transitional region tapering at an angle in the lowering direction of the die.

Document WO2011048437 discloses a truss construction for a passenger conveyor. The invention relates to a truss construction for a passenger conveyor comprising at least one self-supporting element. The self-supporting element, which is a roller molded element, extends in a conveying direction of the passenger conveyor and is formed with at least one rail portion for guiding step chain rollers and/or step rollers.

Document US2009/0050443 discloses a travelator, moving ramp or escalator for transporting passengers, and it comprises conveyor mounted on a frame that is supported on a fixed structure. The frame comprises a number of mutually identical profiled metallic bodies joined together end to end one after the other and containing coupling, supporting and/or guide elements integrated in the profiled metallic body of solid material.

Document US2013/0228414 discloses an escalator or a moving walkway which includes a support structure and a soffit plate. A first side edge region of the soffit plate is fixedly connected with the support structure. In addition, the soffit plate is biased between the first side edge region and a second side edge region, which is opposite the first side edge region, by a predetermined biasing force. In order to maintain the bias the second side edge region is fixedly connected with the support structure, wherein through the maintenance of the biasing force a stiffness of the support structure is increased and in operation of the escalator or the moving walkway the output of noise is reduced.

Document EP2527283 discloses a support, a module to be placed on the support, and a transport system for displacement of people/goods modernized with the module and a modernization method of transport systems for displacement of people/goods. The support has: fixings to fix the support to a bearing structure of the transport system, horizontal tie plates to support and horizontally place the module, lateral tie plates to support and laterally place the module, longitudinal tie plates to support and longitudinally place the module. The module has positioning and verification equipment to place the module maintaining within tolerances the system lines of the transport system. The transport system has: a support and an entrance/exit/central module on an entrance/exit finished floor/in a central section.

Document U.S. Pat. No. 6,685,002 shows a method of modernizing an escalator using modular components. The mechanical and electrical parts of an existing escalator are removed, leaving only the structural truss framework and cross members as well as external parts, such as external panels, that interface with the building. A single module is placed at the top of the escalator and another module at the bottom. A plurality of incline modules are placed in the central inclined part of the escalator, at each cross member. By utilizing these modules, the assembly of the escalator is simplified. Furthermore, an entirely new escalator system using the latest technology may be installed rather than merely installing new parts in an old system.

Document US2002/0175039 discloses a support structure for an escalator, which includes a bottom landing, a top landing, and a rise that interconnects the bottom and top landings. An improved truss design comprised of steel modules that are stamped or bent is used to form the rise, the top landing, and the bottom landing. The modules have closed sides, which increases the strength and stiffness of the truss while also providing the enclosure for internal escalator components. The modules are either formed as a single piece or formed from multiple pieces that are welded or fastened together. The modules are then secured to each other to form the rise, the top landing, and the bottom landing.

SUMMARY OF THE INVENTION

The present invention provides an advantage with respect to the current modular trusses for escalators and moving walkaways, providing a modular and accurate truss, with both guide supports and balustrades supports integrated, which reduces the number of components and saves time in the escalator or moving walkway assembly line.

This truss comprises three independent modules which are joined together in a complex structure. These modules are an upper module, a central module, and a lower module.

Each module comprises a first side, a second side, which is opposite to the first side, and a soffit plate placed between both sides. Each side of the modules has in turn a lower profile and an upper profile, which according to a preferred embodiment of the invention, are cold rolled profiles.

Therefore, steel hot rolled profiles or tubes with poor finished and bad dimensional and geometrical tolerances of the prior art are replaced by custom-made cold rolled steel profiles with good tolerances.

The modules of the escalator/moving walkway have vertical beams placed between the lower profile and the upper profile of each side. Said vertical beams are the vertical guide supports for supporting and positioning the guiding system of the escalator/moving walkway. These vertical guide supports includes a plurality of ledges and/or noses to accurately position the guiding system of the escalator/moving walkway on the truss, in terms of parallelism and perpendicularity, and the specific geometry thereof will depend on the guiding system that will be supported and positioned by said vertical guide supports. So, vertical guide supports are now part of the structure itself, contributing to the overall stiffness of the truss. In addition, these guide supports, manufactured by press forging, stamping or bending steel sheet ensure good tolerances and mechanical properties.

Additionally, the modules have diagonal beams arranged between the lower profile and the upper profile of each side, and according a particular embodiment of the invention each diagonal beam is placed between two consecutive vertical guide supports of each side. By means of this configuration, the lower profiles of the modules support directly the outer cladding of the escalator/moving walkway, whereas that the upper profiles of the modules support directly the balustrades and the outer decking profiles of the escalator/moving walkway, since cross sections of these lower and upper profiles have a high moment of inertia, and its behaviour regarding deflection and stresses will be suitable for supporting directly the outer cladding and the balustrades and the outer decking profiles of the escalator/moving walkway respectively. Preferably, the upper profile may have two differentiated parts. Firstly, the lower part of the upper profile, which is an open part directly connected to vertical and diagonal beams with several protuberances to allow connections and to enhance rigidity of the truss. And secondly, the upper part of the upper profile is wider than the lower part thereof, and it includes a plurality of specific shapes to connect the outer decking profile in the outer side and the glass balustrade in the inner side. Regarding the lower profile, it is uniform and quite similar to the lower part of the upper profile, it is narrow and it includes several protuberances on both sides to allow connections and to enhance rigidity of the truss. So, supports for outer cladding, balustrades and outer decking profiles are also integrated in the structure itself. In order to improve the rigidity and to enhance the structural behaviour of the assembly, the modules of the escalator/moving walkway have a plurality of crossbars between both sides, each crossbar placed between a pair of opposite vertical guide supports, preferably perpendicularly to both sides.

In accordance with a particular embodiment of the invention, the upper module and the lower module are joined to the central module by means of at least a joining bended plate placed at the ends of said upper and lower modules.

The first stage of the method is an assembly of a first side and a second side opposite to the first side, for each one of the three modules of the escalator/moving walkway.

Then, a soffit plate is placed between both sides of each module, and finally the modules are assembled together.

According to the object of the present invention, the assembly of each side of the modules includes a cold rolling of a lower profile and an upper profile, and a cold joining of vertical beams, or vertical guide supports between the lower profile and the upper profile, these vertical guide supports for supporting and positioning the guiding system of the escalator/moving walkway. Additionally, the assembly of the sides of the modules includes a cold joining of diagonal beams between the lower profile and the upper profile, and according a particular embodiment of the invention each diagonal beam is arranged between two consecutive vertical guide supports.

According this method object of the present invention, an outer cladding of the escalator/moving walkway will be attached directly to the lower profiles by cold joining means, and balustrades and outer decking profiles of the escalator/moving walkway will be attached directly to the upper profiles also by cold joining means.

So, in order to avoid thermal loads generated during the process and therefore deformations in the truss, the assembly between different parts is not made by welding, but by cold joining technologies.

With this invention, the truss plays an additional role, besides of the structural one, and thanks to its good dimensional tolerances it is now able to support and position the whole guiding system and both right and left balustrades of the escalator directly over the upper profiles.

So, guide supports and balustrade supports adjusting tasks of prior assemblies are removed from the present assembly method, saving intermediate parts and assembling time.

Additionally, by using the cold joint technologies, it is possible to get good general dimensions in the trusses, and in addition, sparks, fumes or noises are not generated. Besides, energy consumption is low. Therefore, the assembly method can be considered environmentally friendly.

In order to improve the rigidity and to enhance the structural behaviour of the assembly, the method may include a cold joining of a plurality of crossbars between both sides of the modules, placing each crossbar between a pair of opposite vertical guide supports, preferably perpendicularly to both sides.

One of the most critical points in the current escalator and moving walkway trusses is the assembly of upper and lower modules to the central one, due to the high amount of heat generated when welding. These thermal loads results in a deformation between different modules that make impossible achieve the required angle of the escalator or the moving walkway.

So, in accordance with a particular embodiment of the invention, the assembly of the upper module and the lower module to the central module is made by the cold joining of joining bended plates to the ends of the modules, Preferably the cold joining in this case is clinching. These joining bended plates are conformed specifically according to the escalator requirements. Besides, since the connection between upper module and central module is the most demanded zone of the escalator/moving walkway regarding loads, the method object of the present invention reinforce the area and improve the strength in this transition point, due to the substitution of welding by cold joining technologies. Again, since this joint is made by cold joining technologies instead of welding, an important reduction in the energy consumption is also performed.

According to different particular embodiments of the invention, the cold joining includes a method which may be clinching, bolting, riveting, screwing, using adhesives, and any combination of any of them.

In addition to all of this, one of the main advantages of the present method over the prior art, is to replace an archaic and obsolete manufacturing process depending on high skilled welders, by a fully automatic process. Most of cold joint technologies can be easily automated ensuring a high degree of repetitiveness instead of the current process, in which it is not possible to achieve the same final result in two theoretically identical escalator or moving walkway trusses.

Additionally, this is an environmental friendly and sustainable manufacturing method, and it allows a reduction in the number of components and in the number of assembly stages that result in a more cost-effective truss for escalators/moving walkways.

BRIEF DESCRIPTION OF THE DRAWINGS

Next, in order to facilitate the comprehension of the invention, in an illustrative rather than limitative manner an embodiment of the invention with reference to a series of figures shall be made below.

Figure 1:
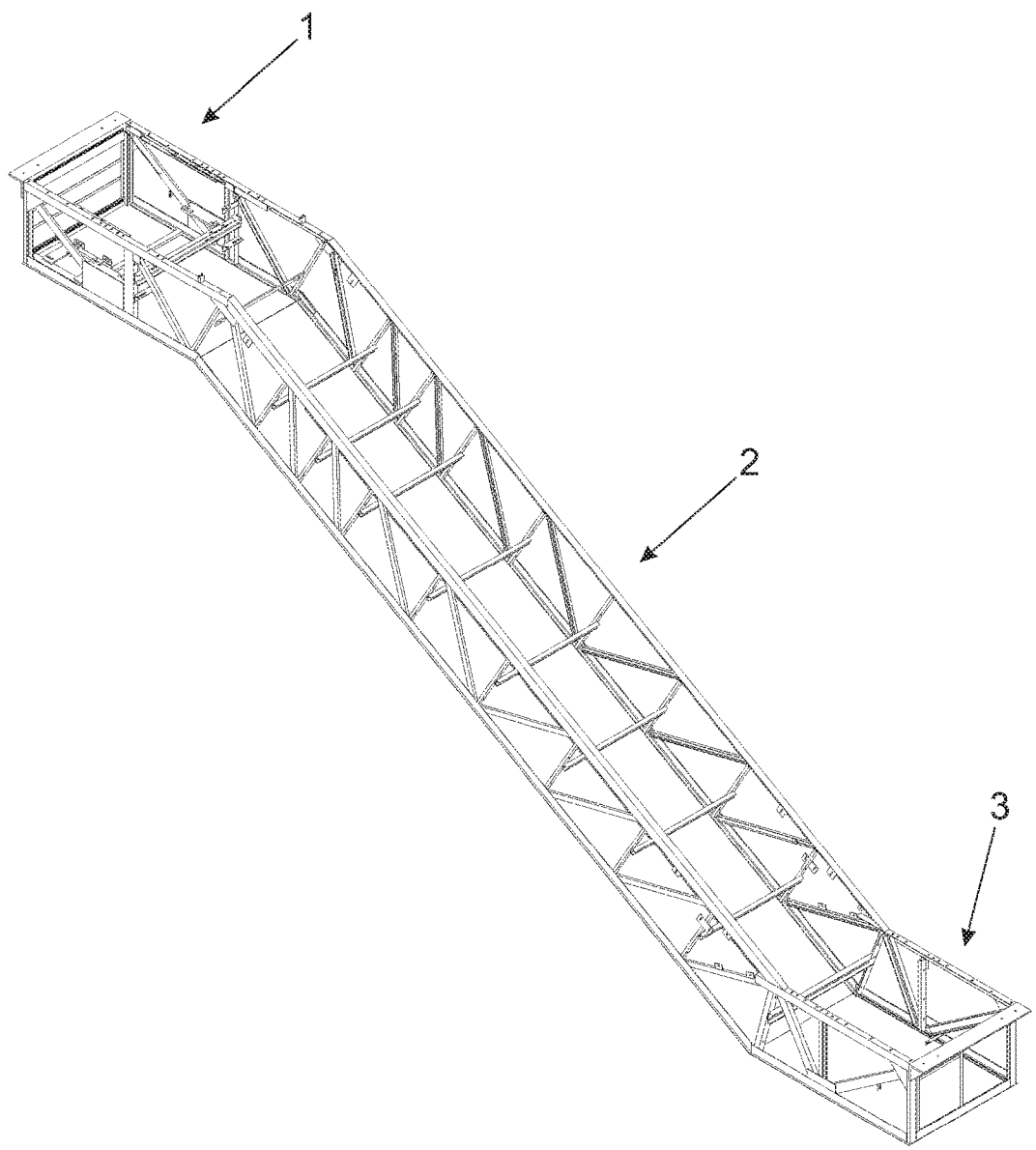
FIG. 1 shows an overall and schematic view of an escalator/moving walkway modular truss including an upper module, a central module, and a lower module.
Figure 2A:
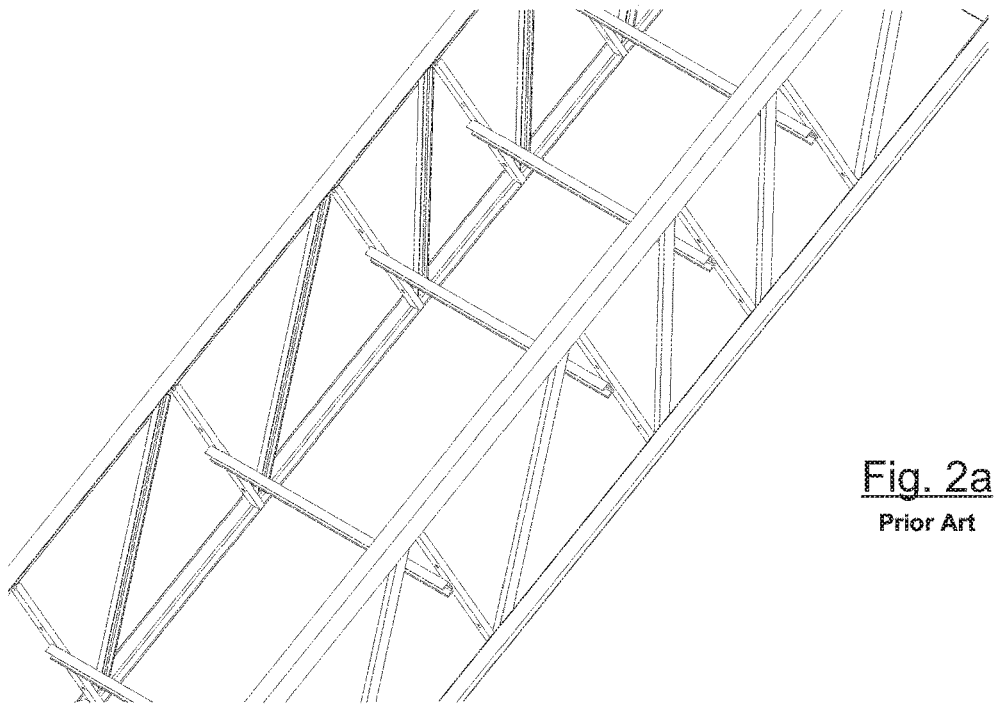
FIGS. 2a, 2b, 2c and 2d show detailed views of an assembly process of a truss known in the prior art.
Figure 2B:
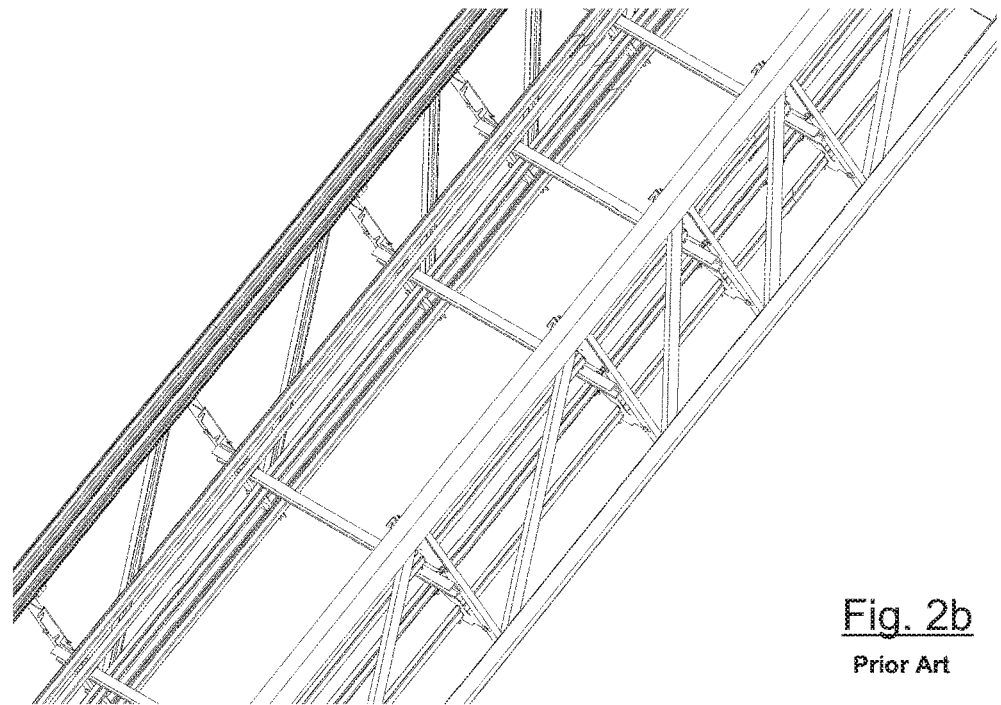
Figure 2C:
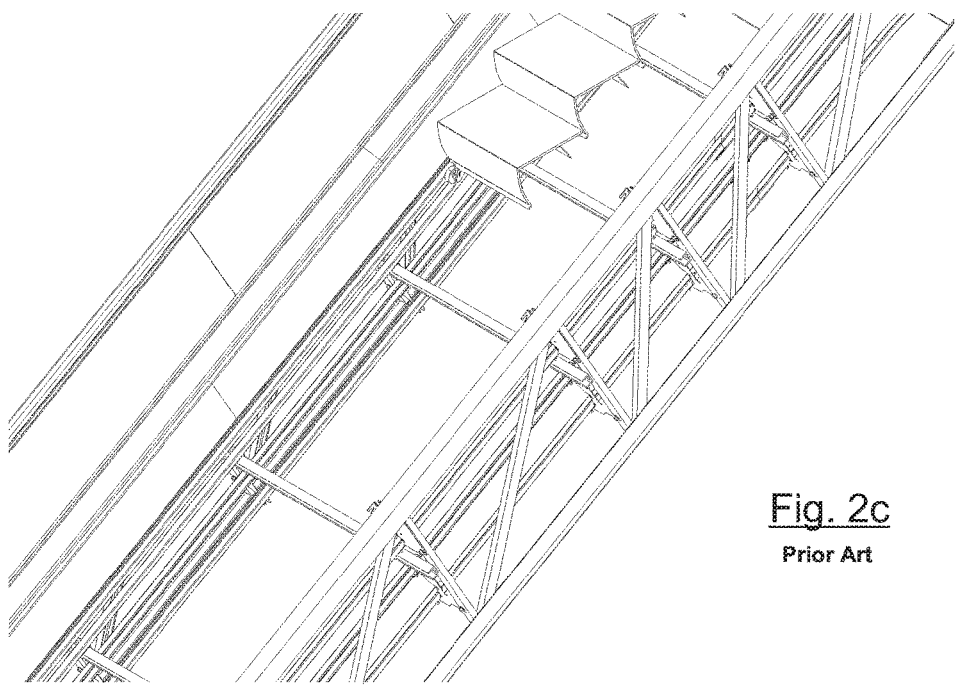
Figure 2D:
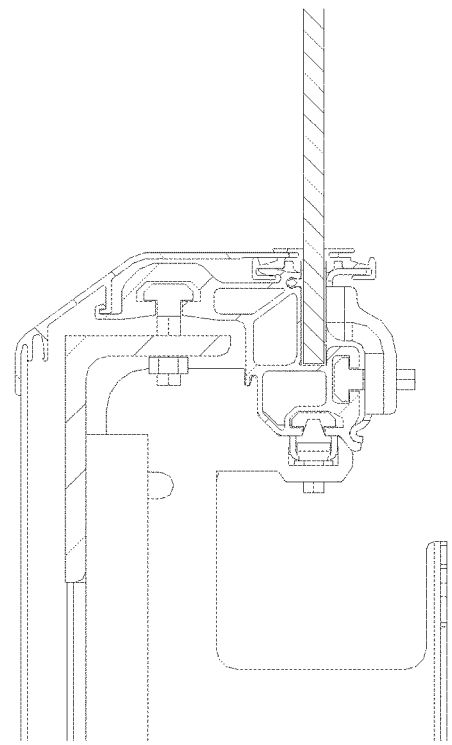

These figures refer to the following set of elements:
1. upper module of the escalator/moving walkway
2. central module of the escalator/moving walkway
3. lower module of the escalator/moving walkway
4. first side of the modules
5. second side of the modules
6. lower profiles of the modules
7. upper profiles of the modules
8. soffit plate of the modules
9. vertical guide supports of the modules
10. diagonal beams of the modules
11. crossbars of the modules
12. balustrades of the escalator/moving walkway
13. outer decking profiles of the escalator/moving walkway
14. joining bended plates
15. outer cladding.

DESCRIPTION OF THE INVENTION

One object of the present invention is an escalator/moving walkway modular truss.

As shown in the figures, the modular truss has an upper module 1, a central module 2, and a lower module 3.

Figure 3:
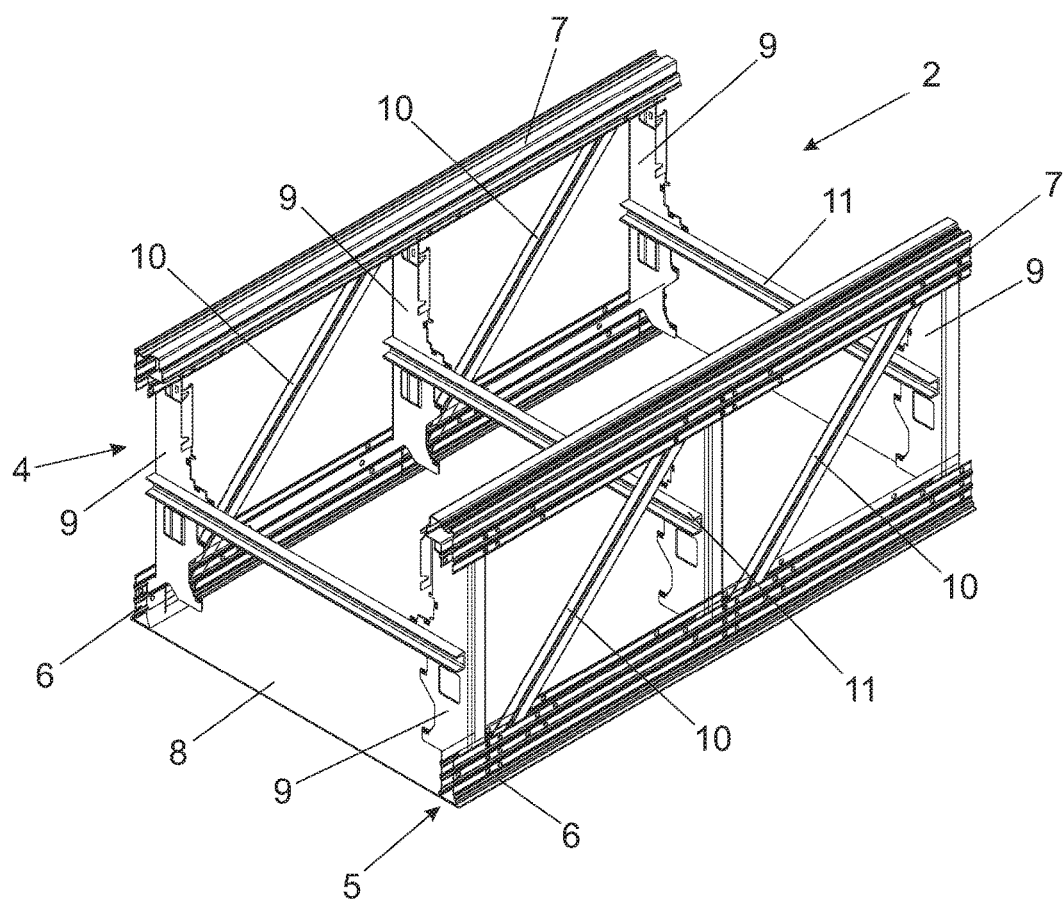
FIG. 3 shows a central module for an escalator/moving walkway modular truss object of the present invention.

As it can be seen in FIG. 3, each module 1,2,3 has a first side 4 and a second side 5 which is opposite to the first side 4, and a soffit plate 8 placed between both sides 4,5. Additionally, each side 4,5 of the modules 1,2,3 comprises in turn a lower profile 6 and an upper profile 7, which preferably are cold roller profiles 6,7.

The modules 1,2,3 of the truss of the present invention have a plurality of vertical beams placed between the lower profile 6 and the upper profile 7 of each side 4,5. These vertical beams are vertical guide supports 9 configured for supporting and positioning the guiding system of the escalator/moving walkway. Also, the modules 1,2,3 have a plurality of diagonal beams 10 between the lower profile 6 and the upper profile 7 of each side 4,5. According a particular embodiment of the invention, each diagonal beam 10 is placed between two consecutive vertical guide supports 9 of each side 4,5.

Figure 4A:
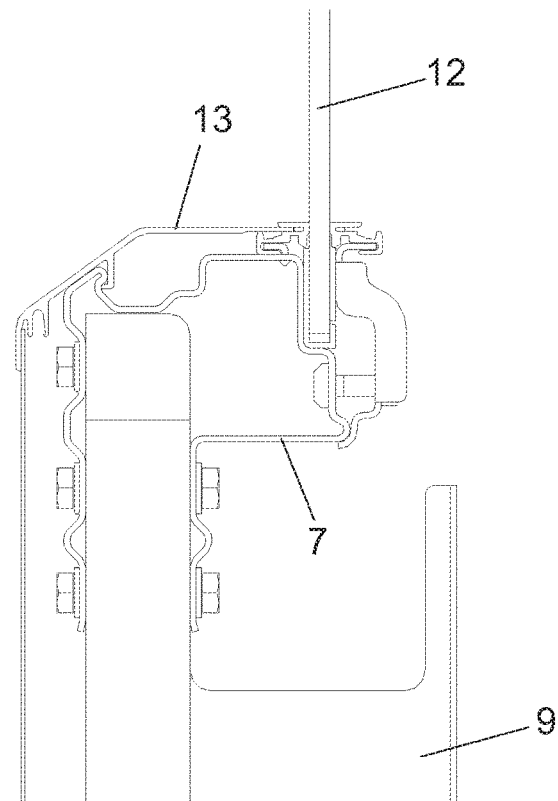
FIG. 4a shows a schematic view of an upper profile of the direct joining of different structures to the truss of the present invention.
Figure 4B:
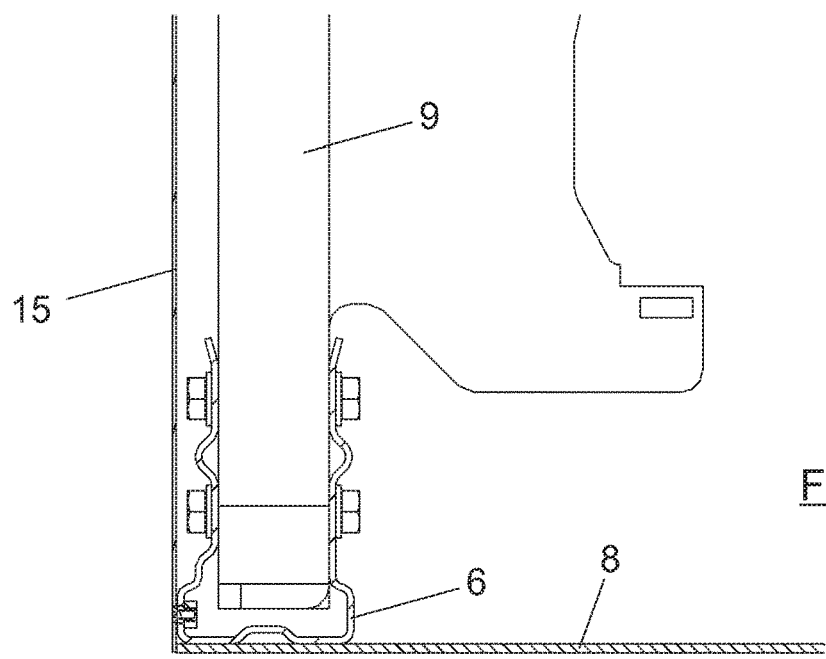
FIG. 4b shows a schematic view of a lower profile of the direct joining of different structures to the truss of the present invention.

According to this invention, the lower profiles 6 are a direct support for an outer cladding 15 of the escalator/moving walkway, and the upper profiles 7 are a direct support for balustrades 12 and outer decking profiles 13 of the escalator/moving walkway. FIG. 4b shows a schematic view of the direct union of an outer cladding 15 of the escalator/moving walkway to the lower profile 6, and FIG. 4a shows the direct union of balustrades 12 and outer decking profiles 13 to the upper profile 7

Each module 1,2,3 has a plurality of crossbars 11 between both sides 4,5, and each crossbar 11 is placed between a pair of opposite vertical guide supports 9, preferably perpendicularly to both sides 4,5. These crossbars 11 improve the rigidity of the assembly, enhancing the structural behaviour of the modular truss.

Figure 5:
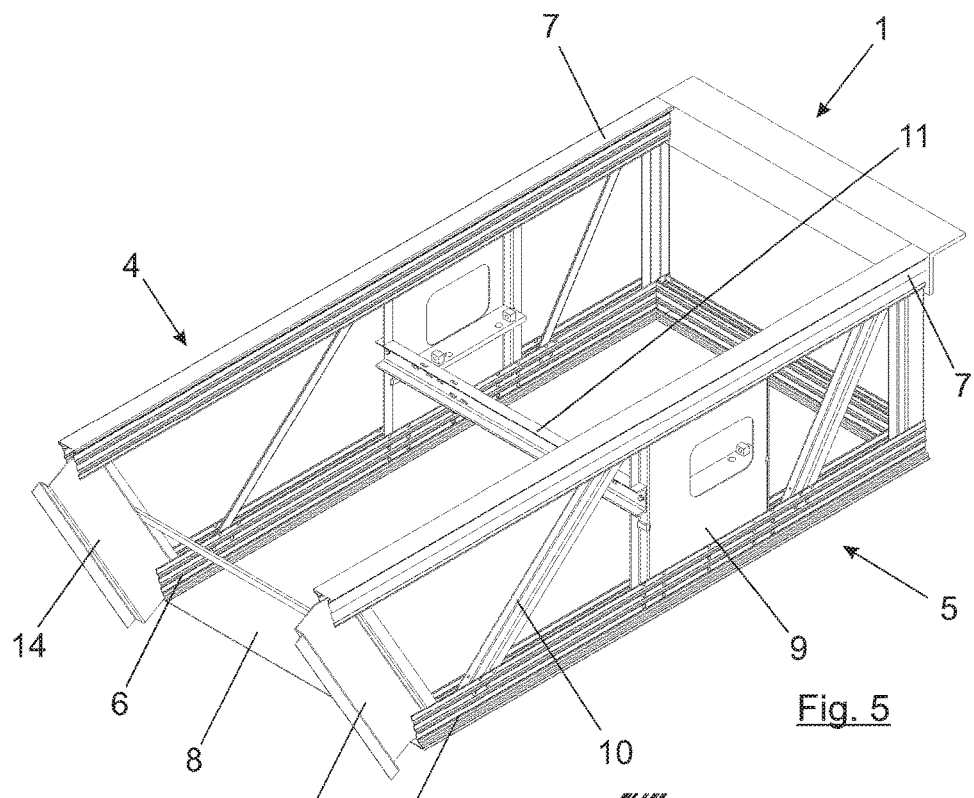
FIG. 5 shows an upper module including joining bended plates according a preferred embodiment of the present invention.

According a particular embodiment of the invention, the upper module 1 and the lower module 3 are joined to the central module 2 by means of at least a joining bended plate 14 which is placed at the ends of said upper 1 and lower 2 modules. Preferably the truss has a joining bended plate 14 placed at the end of each side 4,5 of the upper module 1 and the lower module 3. These joining bended plates 14 have the same height as the sides 4,5, and are arranged between the lower profile 6 and the upper profile 7. FIG. 5 shows an upper module including these joining bended plates 14 according this preferred embodiment.

Another object of the present invention is a method of assembling an escalator/moving walkway modular truss formed by an upper module 1, a central module 2, and a lower module 3.

The method includes an assembly of a first side 4 and a second side 5 opposite to the first side 4 for each module 1,2,3, and attaching a soffit plate 8 between both sides 4,5 of each module 1,2,3, specifically between opposite lower profiles 6. Later, the three modules 1,2,3 are assembled together.

According to the method of the present invention, the assembly of each side 4,5 of the modules includes first a cold rolling of a lower profile 6 and an upper profile 7, and then a cold joining of a plurality of vertical guide supports 9 between the lower profile 6 and the upper profile 7, said vertical guide supports 9 intended for supporting and positioning the guiding system of the escalator/moving walkway. Also, the assembly includes a cold joining of a plurality of diagonal beams 10 between the lower profile 6 and the upper profile 7, and according a particular embodiment of the invention, each diagonal beam 10 is arranged between two consecutive vertical guide supports 9.

The method includes a cold joining of a plurality of crossbars 11 between both sides 4,5 of the modules 1,2,3. Each crossbar 11 is placed between a pair of opposite vertical guide supports 9, preferably perpendicularly to both sides 4,5 of the modules 1,2,3.

In accordance to a particular embodiment of the method of the present invention, the assembly of the upper module 1 and the lower module 3 to the central module 2 is made by a cold joining of bended plates 14 to the ends of the modules.

Figure 6:
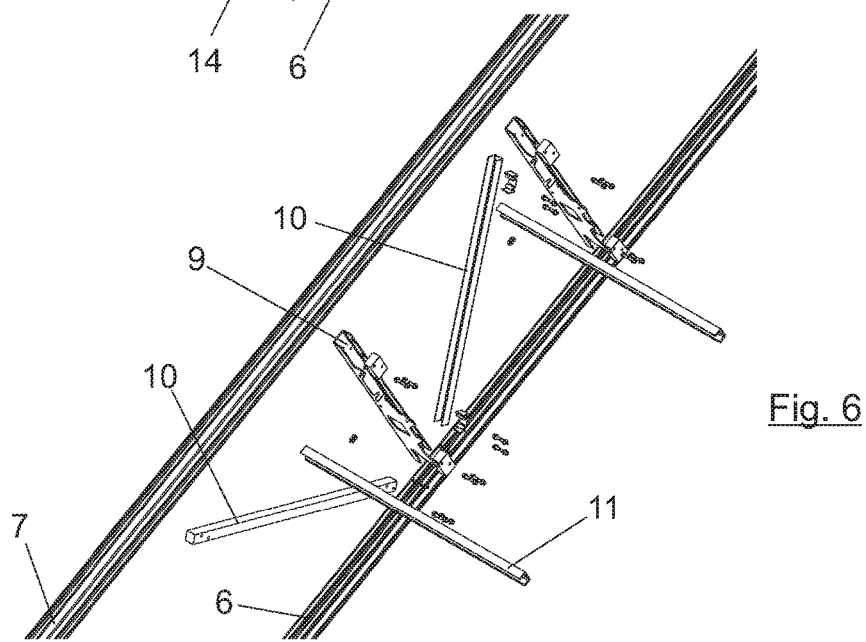
FIG. 6 shows the assembly of different elements of the present invention by bolting.

According to different particular embodiments of the invention, the cold joining of the different elements of the assembly includes a method which may be selected between clinching, bolting, riveting, screwing, using adhesives, and a combination of these methods. FIG. 6 shows particularly the assembly of different elements of the invention by bolting.

Once the invention has been clearly described, it is hereby noted that the particular embodiments described above can be the subject of detail modifications as long as they do not alter the fundamental principle and the essence of the invention.

The invention claimed is:

1. An escalator/moving walkway modular truss comprising:
    an upper module;
    a central module; and
    a lower module, each module comprising:
        a first side;
        a second side opposite to the first side, the first side and the second side each comprising a lower profile and an upper profile; and
        a soffit plate placed between the sides;
    each module further comprising:
    a plurality of vertical beams placed between the lower profile and the upper profile of each side, the vertical beams comprising vertical guide supports configured for supporting and positioning a guiding system of the escalator/moving walkway;
    a plurality of diagonal beams between the lower profile and the upper profile of each side; and
    a plurality of crossbars between each side, each crossbar placed between a pair of opposite vertical guide supports,
    wherein the lower profile of each module is directly connected to an outer cladding of the escalator/moving walkway to directly support the outer cladding,
    wherein the upper profile of each module directly supports at least one balustrade and outer decking profile of the escalator/moving walkway, and
    wherein the soffit plate extends between the sides and is located below a lower end of the vertical beams to connect the lower ends of the vertical beams.

2. The escalator/moving walkway modular truss according to claim 1, wherein the lower profile and the upper profile of each module are cold rolled profiles.

3. The escalator/moving walkway modular truss according to claim 1, further comprising at least one joining bended plate placed at ends of the upper module and the lower module and configured to join the upper module and the lower module to the central module.

4. The escalator/moving walkway modular truss according to claim 3, wherein each of the joining bended plates is placed at an end of each side of the upper module and the lower module, the joining bended plates having a same height as the sides of the upper module and the lower module, and arranged between the lower profile and the upper profile.

5. The escalator/moving walkway modular truss according claim 1, wherein each diagonal beam is placed between two consecutive vertical guide supports of each side.

6. The escalator/moving walkway modular truss according to claim 1, wherein the lower profile includes protuberances to directly connect to the outer cladding to directly support the outer cladding.

* * * * *